(12) United States Patent
Moran et al.

(10) Patent No.: US 11,699,046 B2
(45) Date of Patent: Jul. 11, 2023

(54) SORTABLE TRACKING OBJECT

(71) Applicant: United States Postal Service, Washington, DC (US)

(72) Inventors: Robert Charles Moran, Crofton, MD (US); Marlon Guy Wells, Fort Washington, MD (US); Veronica Yvette Hale, Waldorf, MD (US); Ellis Mitchell Gore, Falls Church, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 17/031,646

(22) Filed: Sep. 24, 2020

(65) Prior Publication Data
US 2021/0089727 A1 Mar. 25, 2021

Related U.S. Application Data

(60) Provisional application No. 62/905,613, filed on Sep. 25, 2019.

(51) Int. Cl.
G06K 7/10 (2006.01)
B07C 5/344 (2006.01)
G06K 19/07 (2006.01)

(52) U.S. Cl.
CPC .......... G06K 7/10099 (2013.01); B07C 5/344 (2013.01); G06K 7/10435 (2013.01); G06K 19/0723 (2013.01); *G06K 2007/10504* (2013.01)

(58) Field of Classification Search
CPC ........... G06K 7/10099; G06K 7/10435; G06K 19/0723; B07C 5/344; G06Q 10/0833
See application file for complete search history.

(56) References Cited

U.S. PATENT DOCUMENTS

| | | | |
|---|---|---|---|
| 10,745,210 B2 * | 8/2020 | Aljoe | B65G 47/49 |
| 10,771,926 B1 * | 9/2020 | Carr | G01S 5/0027 |
| 2006/0055552 A1 * | 3/2006 | Chung | B60R 25/00 |
| | | | 340/10.5 |
| 2006/0214791 A1 * | 9/2006 | Tethrake | A61B 90/98 |
| | | | 340/572.1 |
| 2007/0126578 A1 * | 6/2007 | Broussard | G06Q 10/087 |
| | | | 705/28 |
| 2008/0088450 A1 * | 4/2008 | Kwan | G07G 3/003 |
| | | | 340/572.1 |
| 2012/0187197 A1 * | 7/2012 | Masin | G06K 19/07758 |
| | | | 235/492 |

\* cited by examiner

*Primary Examiner* — Vernal U Brown
(74) *Attorney, Agent, or Firm* — Knobbe, Martens, Olson & Bear, LLP

(57) ABSTRACT

Sortable tracking objects that can be associated with item containers and items for tracking and organization.

18 Claims, 7 Drawing Sheets

SORTABLE TRACKING OBJECT

INCORPORATION BY REFERENCE

Any and all applications for which a foreign or domestic priority claim is identified in the Application Data Sheet as filed with the present application are hereby incorporated by reference under 37 C.F.R. § 1.57. This application claims the benefit of priority to U.S. provisional application 62/905,613, filed Sep. 25, 2019, the entire contents of which are hereby incorporated by reference.

BACKGROUND

This disclosure relates to sortable tracking objects. In particular, this disclosure relates to sortable RFID enabled tracking objects that can be associated with item containers and items for tracking and organization.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include towing and connections.

In some aspects, a method of tracking items is disclosed. The method can include providing a tracking object. The tracking object can include a radio-frequency identification (RFID) tag. The tracking object can include an outer periphery that encloses the tag. The method can include introducing the tracking object into item processing equipment. The method can include processing a plurality of items. The item processing equipment can have a plurality of bins. The plurality of bins can be associated with an intended destination. The bins can receive a plurality of items from the item processing equipment. The method can include scanning the tracking object with a sensor. The method can include determining one of the plurality of bins in the item processing equipment to which the tracking object is to be sorted. The method can include sorting, in the item processing equipment, the tracking object to the determined one of the plurality of bins. The method can include associating the tracking object with the determined one of the plurality of bins and with items of the plurality of items which are sorted to the bin.

In some aspects, the plurality of bins can each comprise an item container located thereat. In some aspects, sorting the tracking object to the determined one of the plurality of bins can include moving the tracking object into the item container located at the determined one of the plurality of bins.

In some aspects, the method can include moving items of the plurality of items into the item container at the one of the plurality of bins based on the intended destination of the items.

In some aspects, the method can include associating the tracking object with item information for the items of the plurality of items sorted to the item container.

In some aspects, the method can include moving the item container within a distribution network past a reader.

In some aspects, the method can include scanning, by the reader, the tracking object in the container.

In some aspects, the method can include updating item information for the items of the plurality of items in the item container based on the scanning of the tracking object.

In some aspects, the method can include scanning the tracking object in the container and disassociating the tracking object with items of the plurality items.

In some aspects, the method can include deleting data stored in the physical memory upon the tag interacting with the reader.

In some aspects, the tracking object is a rectangular prism having six flat surfaces and the code is on each of the flat surfaces.

In some aspects, a method is disclosed of tracking items utilizing a tracking object. The method can include providing a tracking object that can include a radio-frequency identification (RFID) tag and an outer periphery that surrounds the tag. The method can include introducing the tracking object into a sortation volume that can include items. The method can include scanning the tracking object with a sensor. The method can include sorting the tracking object to a bin location and into an item container positioned at the bin location. The method can include associating the tracking object with items sorted into the item container at the bin location. The method can include interacting the tag of the tracking object with a reader to generate scan events that are recorded in a database.

In some aspects, the method can include interacting the tag of the tracking object with a second reader to disassociate the tracking object from the items such that the tracking object can be reused.

In some aspects, the tracking object can include a physical memory that can record interaction data between the RFID tag and the reader.

In some aspects, the method can include deleting data stored in the physical memory upon the RFID tag interacting with the second reader.

In some aspects, a tracking object is disclosed. The tracking object can include an outer periphery bounding an internal volume. The outer periphery can help facilitate processing in automated processing equipment. The tracking object can include a tag disposed within the internal volume. The tag can emit a signal. The signal can include a unique identifier. The tracking object can include a filler material disposed within the internal volume and around the tag that can maintain the tag at a central location within the internal volume. The tracking object can include a computer readable code positioned on an external surface of the outer periphery.

In some aspects, the outer periphery can be sized to have at least one dimension larger than a minimum distance for preventing the emitted signal from the tag to experience interference from a metal surface proximate the outer periphery.

In some aspects, the computer readable code encodes a value that can be associated in a tag database with the unique identifier.

In some aspects, the computer readable code can encode the same identifier as in the unique identifier emitted in the signal.

In some aspects, the tag can include writeable memory. The writeable memory can store an intended destination for the tracking object.

In some aspects, the tag can emit the signal in response to interrogation by electromagnetic radiation.

In some aspects, the tag can emit the signal at a given periodicity.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
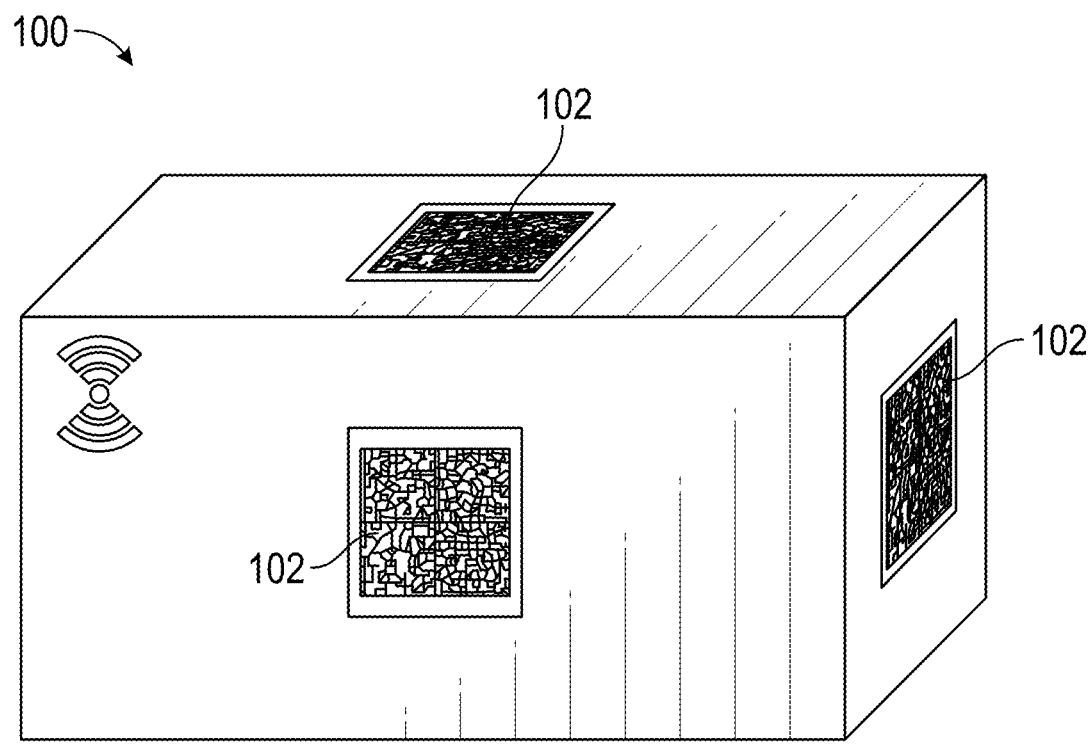
FIG. 1 depicts an embodiment of a tracking object.

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include sortable RFID enabled tracking objects.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The quantity of items being handled by logistics systems, for example, by distribution networks, is rising. Items referred to herein may be mailpieces, such as letters, magazines, flats, packages, parcels, etc.; luggage; cargo; boxes; pallets; etc.; or any other item of inventory which is transported or delivered in a distribution system or network. The term item may also refer to a unit or object which is configured to hold one or more individual items, such as a container which holds multiple letters, magazines, boxes, etc. The term item container or container may include any object, container, storage area, rack, tray, truck, train car, airplane, or other similar device into which items or articles may be inserted and subsequently transported, as are commonly used in distribution systems and networks.

Often large quantities of items need to be moved and tracked quickly and efficiently. Consequently, distribution networks, such as the United States Postal Service (USPS), sometimes use item containers to move and/or organize large quantities of items in an efficient manner. Where individual items, such as parcels, mailpieces, etc., are to be moved, the individual items may be aggregated into containers, such as bags, pallets, racks, carts, rolling stock, etc., which can each hold or contain a plurality of individual items. In order to properly track the individual items, an association between the individual item and the container it is in are stored, and the container is tracked. The items can have item records stored in databases of the distribution network. The item records for items in a container can be updated and associated with an identifier of a container, a placard, etc. This can be called nesting items within a container. When the container is scanned, handled, etc., that even can be applied to all the items nested within the container. Thus, the movement of the container is associated with each of the plurality of items in the container, and records for each of the individual items can be updated according to the tracking of the container.

The movement of the containers, and any items therein, is tracked by manually scanning a code, such as a computer readable code or human readable code. For example, operators manually indicate on the container or manually scan the container when the item container is closed or loaded onto a trailer for shipment. Manually indicating handling events or scanning events, however, can lead to missed event records, errors, and inefficiency.

Due to the large number of containers, varying types and sizes of containers, the interoperability of containers, the turnover in containers, damage to containers, and the potential for a tag on a container to become damaged or fall off, it may be too difficult, expensive, and/or time consuming to apply tags or codes to and to maintain tags on each of the containers in the distribution network.

Due to these difficulties, it can be advantageous to track containers using a tracking object which is placed in the containers, and which has one or more readable or scannable tags thereon. In some embodiments, the tracking objects described herein include a radio-frequency identification (RFID) that are associated with a container. In some embodiments, the tracking objects can have tags thereon or therein that use a near-field communication (NFC), Bluetooth low energy (BLE), ZigBee, Z-Wave, 2G, 3G, 4G, LTE, cellular, SigFox, mesh networks, or any other wireless communication mechanism or protocol. The tracking objects automate creating scan event records for item containers and/or the items contained therein as the containers move through the distribution network. For example, as the container moves through the distribution networks, the tracking objects can be identified, and scan events can be generated for the tracking objects, and can be recorded for the container associated with the tracking object, and for the individual items in or associated with the item container and/or tracking objects.

In some embodiments, readers or detectors configured to detect the tracking objects are strategically positioned within a distribution facility, such as at a dock door, at input and output points of processing equipment, etc., so that the readers interact with the tag(s) of the tracking object. The reader automatically communicates the interaction to a visibility database such that the "load" event or other event is recorded. This advantageously reduces the likelihood of missed recorded events, errors, and inefficiencies.

The tracking objects can be associated and disassociated from containers and/or items in a server or database, such that a tracking object can be reused, regardless of the facility at which the tracking object ends up. For example, when a container arrives at a distribution facility, the container will likely be opened, emptied, broken up, etc., and the items therein processed separately from the container. When the container arrives at the intended destination for the container and an arrival-at-unit or arrival-at-facility scan occurs, the tracking object can be removed from the container and disassociated from the container. The tracking object can then be put aside to be used with and associated with a subsequent container. The tracking objects disclosed herein can have thereon or can enclose a tag such that interferences resulting from the tag contacting or being in proximity to the metal of a container are reduced, and so that the tag is protected from damage.

FIG. 1 depicts an embodiment tracking object 100. The tracking object 100 includes a tag (not shown). The tag can be disposed within a volume enclosed by the tracking object 100. This can protect the tag from damage or interference which could be caused by contact with or proximity to the container in which it is located. The tag of the tracking object 100 has a unique identifier encoded therein or associated therewith, such that a specific tracking object 100 can be identified among a plurality of tracking objects 100. The tag of the tracking object 100 is readable by sorting equipment, mail processing equipment (MPE), RFID readers, optical cameras, etc. Thus, a tracking object 100 can advantageously be quickly and efficiently recognized or identified at any step or facility within the distribution network.

In some embodiments, the tag of the tracking object 100 can be an active, passive, or semi-passive tag. When passive, the tracking object 100 can have reduced components, relying on the power of a tag reader that sends out electromagnetic waves that induces a response from the tracking object 100. When active, the tracking object 100 can have a transceiver and power source (e.g., battery) such that the power source can run a chip's circuitry, and the transceiver can receive and broadcast signals between the tracking object 100 and the tag reader. The signal can be sent continuously or at a given periodicity, for example, once a second, every two seconds, every 10 seconds, or any smaller or larger periodicity. When semi-passive, the tracking object 100 can have a battery to run a chip's circuitry but rely on a reader's electromagnetic waves to communicate.

As illustrated, the tracking object 100 is a rectangular prism. The tracking object 100 can be a variety of shapes, such as a cube, triangular prism, polygonal prism, and/or other suitable shapes. The tracking object 100 can be a shipping box, such as a flat rate box or other known type of box with a size that is optimized for handling by personnel and by automated equipment. The weight of the tracking object can be set such that it is light enough for easy handling and so it does not tax or strain components of the automated equipment, but heavy enough that it will not be accidentally moved, blown off or out of a desired location, get stuck in equipment, etc. The flat surfaces of the tracking object 100 can advantageously prevent the tracking object 100 from rolling in unintended directions during sortation and/or transportation. The tracking object 100 can be a box, envelope, padded envelope, mailer, parcel, tube, a small cube-shaped object which is not a box, and/or any other suitable objects for inserting into a container of items. The tracking object 100 can have an opening that enables an operator to access an inside of the tracking object 100 to maintain or replace the tracking components, such as an RFID tag, power source, circuitry, antenna, and/or other components.

In some embodiments, the tags may have interference problems when contacting components of a container. In the case of a metal container and an RFID tag, the interference can be high, and can prevent reading of tags by an RFID reader. To prevent or minimize this problem, the tag is enclosed within the outer walls or outer periphery of the tracking object 100 such that the tag maintains a desired distance from the container or other parcels in the container. The distance between the tag and the container and other parcels can reduce or minimize possible interference with reading or scanning the tag. The outer walls of the tracking object 100 can be made of a variety of materials such as plastic, foam, silicone, and/or other suitable polymers or materials. The outer walls or outer periphery of the tracking object 100 can be permeable to electromagnetic waves. The outer periphery or outer walls can protect the tag and associated components from damage, increasing longevity of use.

The tracking object 100 has a unique code 102 thereon that identifies the tracking object 100. The code 102 can be a computer readable code, such as a QR code, a barcode, or other type of readable code, located on one or more outers surface of the tracking object 100. In FIG. 1, the code 102 is positioned on each of the six surfaces of the tracking object 100. The code 102 can be scanned by a sensor, such as a scanner or camera, so that a specific tracking object 100 can be recognized or identified for sortation, tracking, and/or organization. In some aspects, the tracking object 100 has a unique numerical code that enables an operator to manually verify the identity of a tracking object 100. The code 102 can be associated with the unique identifier of the tag of the tracking object 100 such that scanning the code 102 or tag can both result in location updates, status updates, etc. of the tracking object 100. In some embodiments, the code 102 can encode the same unique identifier as that of the tag within the tracking object 100. This can advantageously provide two mechanisms for updating the status, location, etc. of the of the tracking object 100 in a visibility database (described below)—scanning the code 102 or scanning/reading the tag. In some aspects, scanning the code 102 can be advantageous over scanning via the tag. For example, it can be difficult for a reader to distinguish the exact location of one tracking object 100 among a plurality of tracking objects 100 closely grouped together. Accordingly, the code 102 can enable a camera or sensor to precisely determine the location or identity of a tracking object 100, even when a plurality of tracking objects 100 are grouped together. In another example, multiple tags in close proximity can result in interference or other difficulties when being scanned with a reader. Accordingly, the code 102 can enable a camera or sensor to detect or recognize a tracking object 100 with reduced interference issues. In some aspects, an operator can individually scan the code 102 of a tracking object 100 with a mobile scanner to determine the identity of a tracking object 100 or update the location, status, etc. of a tracking object 100. In some aspects, the code 102 is scanned as the tracking object 100 is introduced to processing equipment for sortation, resulting in the status of the tracking object 100 being updated. Scanning the code 102 can enable processing equipment to recognize the tracking object 100. The processing equipment can be in communication with a parcel tracking system that can query the code 102 in a tag database (described below) such that a parcel tracking system begins tracking the tag of the tracking object 100

The tracking object 100 can be a variety of colors. In some embodiments, the tracking object 100 is a color that is conveniently seen by operators during sortation, such as red, orange, yellow, green, a high contrast pattern, and/or other eye-catching colors or patterns. In some embodiments, the tracking object 100 is a muted color, such as brown, black, gray, and/or other colors, so that the tracking object 100 is not easily seen during sortation.

Figure 2:
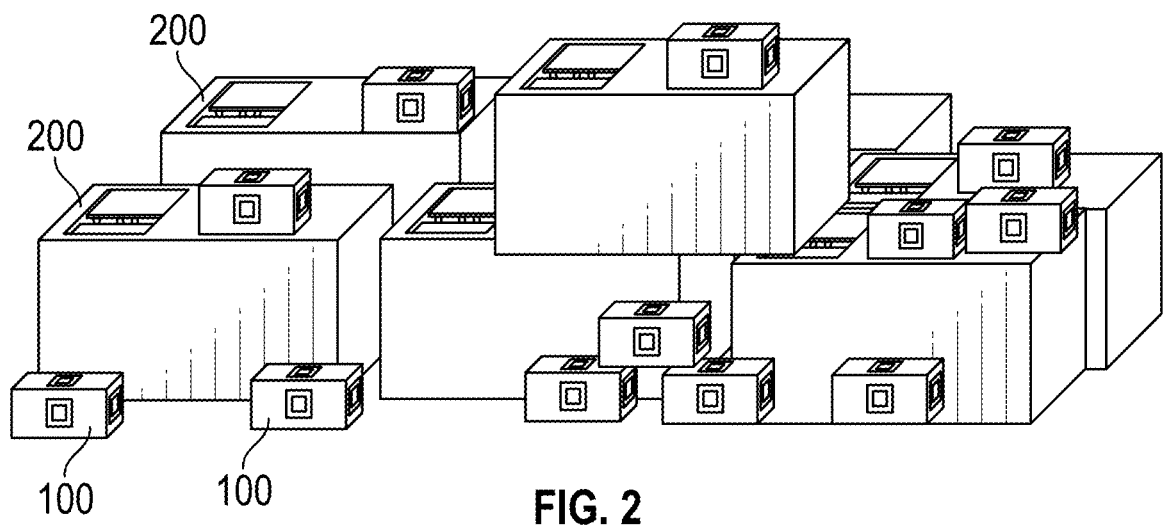
FIG. 2 depicts a plurality of exemplary tracking objects and items for sortation.

FIG. 2 schematically illustrates a plurality of tracking objects 100 and items 200 staged for sortation. The relative positions and sizes of the tracking objects 100 and the items 200 depicted in FIG. 2 is exemplary only, and is not intended to be limiting. The items 200 can be parcels, packages, envelopes, bags, boxes, and/or other items that are used in the distribution network. Before sortation, the tracking objects 100 can be included with the sortation volume, i.e. the items 200.

For example, when a container or shipment of items 200 arrives at a facility, the items 200 can be staged for sortation and/or processing. The facility operators can include a plurality of tracking objects 100 with the items 200 in the staging area. The tracking objects 100 can be fed or inducted into processing equipment with the items 200 intended for delivery.

In some embodiments, a piece of processing equipment, such as MPE, can have a sort plan. The sort plan can include or use a list of incoming items 200 for sortation, and can include a number of output destinations for the items 200. The list can include information regarding the incoming items 200 such as the number of items, item dimensions, sender addresses, recipient addresses, route information for items, estimated number of bins to be used, estimated number of item containers to be used, and/or other relevant information. In some embodiments, a bin can be an output location within item processing equipment that represents a destination. For example, a sorting machine may sort items by destination, and they can be sorted to bins. In some embodiments, a container can be placed at each bin in the machine for filling. When the container at a certain bin is full, then the full container can be removed and an empty container can be placed in or at the bin. The destinations described here can be delivery points to which the items will ultimately be delivered, and can also include the intermediate destinations, such as downstream facilities, other facilities, plants, etc. to which the container may be sent carrying items 200 through the distribution network. The sort plan can determine how many of the incoming items 200 will be sorted intended for each destination, can identify the number of containers that will be needed to hold all the items 200 following processing through the processing equipment.

The sort plan can be communicated to an operator of the processing equipment and can report, indicate, or notify the operator how many containers and how many tracking objects 100 should be inducted or provided to the processing equipment. In some embodiments, a single tracking object 100 should be placed in each container.

In some embodiments, an automated system can be attached to a feeder or induction section of the processing equipment. The sort plan can be communicated to the automated system, or a server can send a request to the automated system to provide a certain number of tracking objects 100 to the processing equipment. The tracking objects 100 can be held in a tray, bin, hopper, chute, loading/replenishment device, etc., and can be automatically introduced into the processing equipment. In some embodiments, the system will request that a specified number of tracking objects 100 in addition to the required number will be added in order to account for any damage, error, etc., that may occur, and to ensure that at least one tracking object 100 can be inserted into each container. In some embodiments, the sort program identifies the number of tracking objects 100 needed based on the number of bins and/or containers to which the items 200 are to be sorted, and/or based on an estimated number of containers for the sorted items, and requests the needed number of tracking objects 100 from the automated system. The automated system can introduce a tracking object 100 into the processing equipment for each bin and/or each estimated container.

Figure 3:
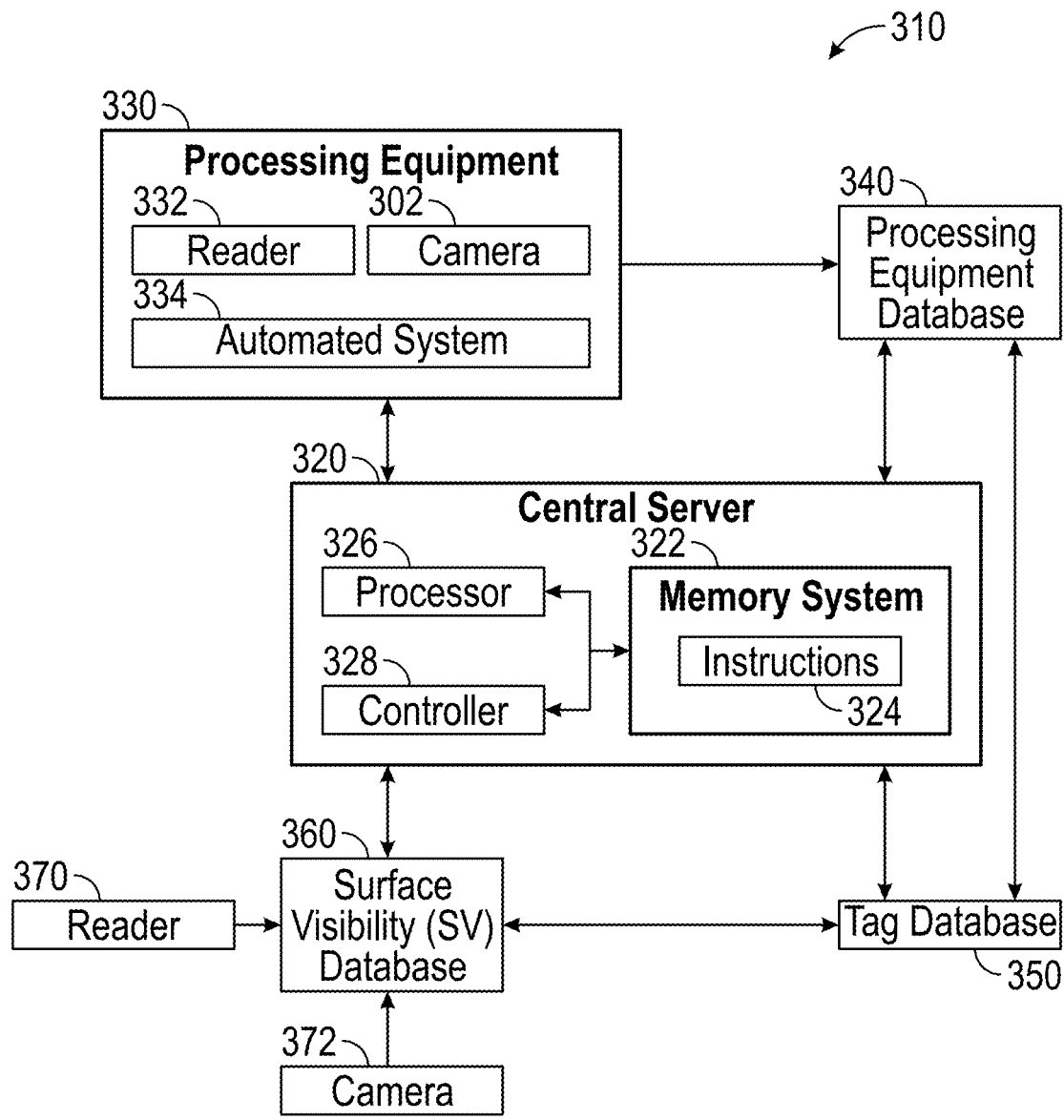
FIG. 3 depicts a block diagram of an exemplary parcel tracking system.

FIG. 3 depicts a block diagram of an exemplary parcel tracking system 310. The parcel tracking system 310 includes a central server 320. The architecture of the central server 320 can include an arrangement of computer hardware and software components used to implement aspects of the present disclosure. The parcel tracking system 310 may include more or fewer elements than those depicted in FIG. 3. It is not necessary, however, that all of these elements be shown in order to provide an enabling disclosure.

The central server 320 includes a processor. As illustrated, the central server 320 includes a memory system 322, processor 326, and controller 328, all of which can communicate with one another by way of a data communication technique.

The processor 326 can read and/or write to memory system 322 and can execute instructions 324 to perform methods disclosed herein. In some aspects, instructions 324 encompass procedures, program code, or other logic that initiates, modifies, directs, and/or eliminates operations necessary or advantageous for the methods described herein. In some aspects, one or more portions of the memory system 322 can be located in a physical location that is separate from the processor 326 and/or controller 328, and can be in wired or wireless communication with the controller 328 and processor 326.

The controller 328 can interface the central server 320 with the other systems, databases, and peripheral devices, such as processing equipment 330, processing equipment database 340, tag database 350, readers, cameras, sensors, etc. The controller 328 can generate commands to effectuate the instructions 324.

The memory system 322 can generally include RAM, ROM, and/or other persistent auxiliary or non-transitory computer-readable media. The memory system 322 can store an operating system that provides computer program instructions for use by the processor 326 in the general administration and operation of the parcel tracking system 310. The instructions 324, when executed by the processor 326, can cause the parcel tracking system 310 to perform the methods described herein. The instructions 324, when executed by the processor 326, can cause the parcel tracking system 310 to obtain data from, communicate or write data to, and/or manipulate data within the visibility database 360, tag database 350, and/or processing equipment database 340. The instructions 324, when executed by the processor 326, can cause the parcel tracking system 310 to interpret, process, and/or analyze data received from the visibility database 360, tag database 350, and/or processing equipment database 340. The instructions 324, when executed by the processor 326, can cause the parcel tracking system 310 to command the processing equipment 330 to perform actions, such as run a sort plan, as described above, sort items 200 into bins positioned around the processing equipment 330, sort tracking objects 100 into bins positioned around the processing equipment 330, and obtain data via readers 332 and/or cameras 302 (or other suitable sensors).

The parcel tracking system 310 includes processing equipment 330. The processing equipment 330 is in communication with the processing equipment database 340 and central server 320. Communication can be accomplished through Wi-Fi, Ethernet, Bluetooth, and/or suitable communication protocols or methods. The processing equipment 300 can execute sort plans, as explained above. The sort plan can include a list of items that is communicated to the central server 320 and/or processing equipment database 340. In some embodiments, the sort plan does not include a manifest or list of items to be processed/sorted, or includes only a partial list of items to be processed/sorted. The processing equipment 330 can include features suitable for processing items. The processing equipment 340 can include an automated system 334, as explained above. The processing equipment can include a reader 332, camera 302, and/or other suitable sensors that are capable of reading the tag or code 102 of the tracking object 100.

The parcel tracking system 310 includes a processing equipment database 340. The processing equipment database 310 can maintain the location, availability, status, or other characteristics of processing equipment 330. In some aspects, the processing equipment database 340 can maintain the location, availability, status, or other characteristics of tracking objects 100 and/or items 200 while being processed by the processing equipment database. The processing equipment database 340 can be in communication with the central server 320, processing equipment 330, and/or tag database 350. Communication can be accomplished through Wi-Fi, Ethernet, Bluetooth, and/or suitable manners.

The parcel tracking system 350 includes a tag database 350. The tag database 350 can include data of the tracking objects 100 and their unique tag identifications. The tag database 350 can include data of the code 102 of each tracking object 100 and the unique tag of each tracking object 100. The tag database 350, in some aspects, records the location of the tracking objects 100. The tag database 350, in some aspects, records the status of tracking objects 100. In some aspects, the tag database 350 can record the destination, container, bin, nesting association, etc. with which the tracking object 100 is associated or other route information. The tag database 350 can be in communication with the central server 320, processing equipment database 340, and/or the visibility database 360. Communication can be accomplished through Wi-Fi, Ethernet, Bluetooth, and/or suitable manners.

The parcel tracking system 360 includes a visibility database 360. The visibility database 360 can maintain the location, availability, status, or other characteristic of all items, containers, transportation vehicles, etc. within the distribution network, and can include item characteristics, such as location of each item, container associations, intended destinations, etc., within the distribution network. The visibility database 360 can include tracking object 100 characteristics and data, such as location, final destination, intermediary destinations, other route information, etc. The visibility database 360 can include container characteristics and data, such as location, etc. The visibility database 360 can include data regarding the association between a tracking object 100 and items 200 and/or container 400. The visibility database 360 is in communication with the central server 320, tag database 350, readers 370, and/or cameras 372. The readers 370 and/or cameras 372 can scan the tracking objects 100, generating a scan event (such as a load event, unload event, stage event, etc.) that is recorded in the visibility database 360. Communication can be accomplished through Wi-Fi, Ethernet, Bluetooth, and/or suitable manners.

Figure 4A:
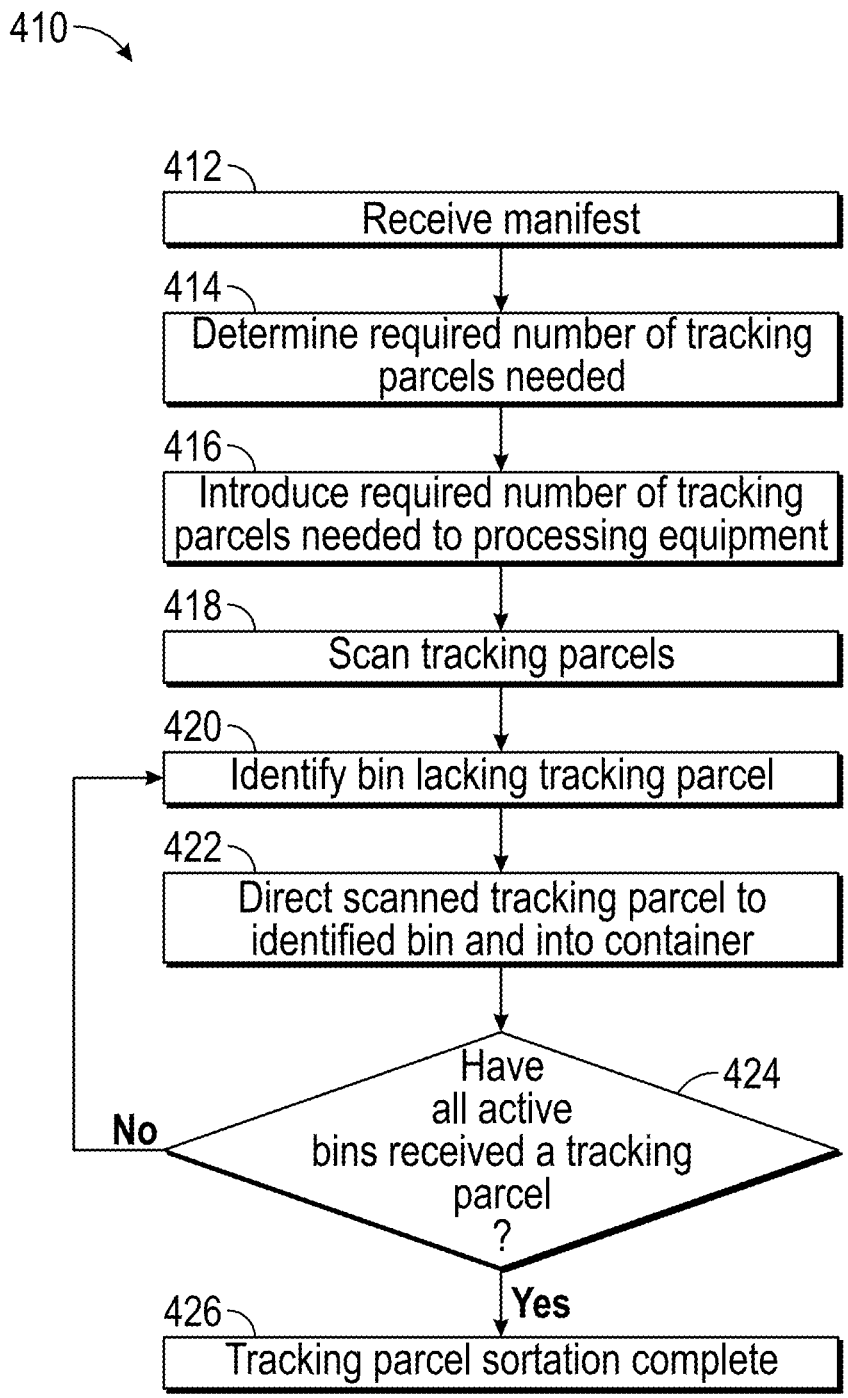
FIG. 4A depicts an exemplary method of sorting tracking objects to bin locations.

FIG. 4A depicts an exemplary process 410 of sorting tracking objects to bin locations. The process 410 begins at block 412, wherein a manifest is received is received by the automated system 334 of the processing equipment 330. In some aspects, the list is received by the central server 320. As detailed above, the manifest can be a list of items to be sorted in a sort plan, and can include an estimate of how many tracking objects 100 are required for the sortation plan. In some aspects, a single tracking object 100 is placed in each container. In some aspects, multiple tracking objects 100 are placed in each container to account for damage, loss, malfunctions, etc. In some embodiments, a manifest may not be received and an estimate of the number of tracking objects 100 is not available.

The process 410 moves to block 414, wherein the automated system 334 or central server 320 determines the number of tracking objects 100 needed based on the list. In some embodiments, the system does not determine the number of tracking objects needed before starting the sort plan. The central server 320 identifies the number of bins, containers, etc. in the equipment, and allocates one or more tracking objects 100 for each bin, container, etc., via an alert to an operator or via an automatic feed hopper.

The process moves to block 416, wherein the automated system 334 or central server 320 commands the introduction of the required number of tracking objects 100 into the processing equipment 330. For example, the tracking objects 100 can be held in a tray, bin, hopper, etc. which can selectively, upon receiving commands from the automated system 334 or central server 320, cause tracking objects 100 to be fed to the processing equipment 330. The number of tracking objects 100 can be an estimated number based on the number of items to process, or based on characteristics of the processing equipment. The tracking objects 100 can be introduced to the processing equipment one at a time, in a batch, or intermittently.

The process 410 moves to block 418, wherein the processing equipment 330 scans the tracking objects 100 using the camera 30, the reader 332, or other component. In some embodiments, the processing equipment 330 scans the code 102 of the tracking object 100 with a camera 302. In some embodiments, the reader 332 detects or reads the tag within the tracking object 100. Upon scanning, the central server 320 can query in the tag database 350 to recognize the code 102 of the tracking object 100. In some aspects, the central server 320 can add the scanned code 102 associated with the tracking object 100 to the tag database 350. The central server 320 can update the visibility database 360 with the status of the tracking object 100, such as activated, in sortation, etc., upon the code 102 being scanned. In some aspects, the parcel tracking system 310 begins tracking the tag of the tracking object 100 upon recognition of the code 102.

The process 410 moves to block 420, wherein the central server 320, the automated system 334, and/or the processing equipment database 340 identifies a bin of the processing equipment that is lacking a tracking object 100, or a bin to which a tracking object 100 has not been sorted. The status of bins and the presence or absence of a tracking object in each bin or container can be stored and updated throughout the run on the processing equipment.

The process 410 moves to block 422, wherein the processing equipment 330 directs the scanned tracking object 100 to the identified bin and into a container 400 positioned at the bin which does not have a tracking object, or which has fewer than the desired quantity of tracking objects 100. When a tracking object 100 passes the camera 302 or the reader 332, the processing equipment 330 scans the tag or the code 102. When the tag or code 102 is scanned, the central server 320 queries the tag database 350 and/or the processing equipment database 340 or other location to determine the status of tracking objects 100 in bins. For example, at the beginning of a run, no bins will have tracking objects 100 therein. The central server 320 will select one of the bins and will direct the tracking object 100 to the selected bin. The tag and/or code 102 of the tracking object will be associated in the memory 322 and/or in other locations with the bin or container. The tracking object 100 code 102 or tag can act as a proxy identifier for a container. As items are added to the bin or container with the tracking object 100 therein, the individual item records are associated with the code 102 and/or tag, and thus are nested in the container identified by the tracking object 100. Each downstream scan of the tag or the code 102, while the tracking object 100 is active, will be applied to the item records associated with the tracking object 100.

The item sortation process continues, and when the processing equipment identifies 330 identifies a second tracking object 100 in the stream of items to sort, the central server 320 again queries the processing equipment 330, the processing equipment database 340, the memory 322, or other location to identify a next bin without a tracking object 100 therein. When the next bin or container without a tracking object 100 is identified, the process described above repeats for that bin and tracking object 100.

When the tracking object 100 is sorted to a bin or container, the tracking object 100 status can be changed in the tag database 350 to Active, In-use, or other indicator. The tracking object 100 can also have an expiration time, date, location, etc., associated therewith. For example, the tracking object 100 is associated with a destination for the container. When the container arrives at the destination, the items in the container may be removed from the container for additional processing, and the items may not be sorted or processed into the same container. When the container is thus broken up, the tracking object 100 can be changed from an active status to an inactive status, or to a standby status, or other similar indicator. This can be updated in the tag database 350. In some embodiments, the tracking object 100 can be updated to inactive, or can be disassociated from the items in the container automatically upon a scan at the intended destination of the container.

The processing equipment 330 can scan tracking objects 100 to verify placement in a bin. The parcel tracking system 310 can associate the sorted tracking object 100 with the bin, container 400, and/or items 200 such that detected movement of the tracking object 100 is understood by the parcel tracking system 310 to signify movement of the items 200 and/or container 400. The association can be recorded in the visibility database 360 and/or tag database 350. In some embodiments, an item 200 can be removed from the container and scanned at a destination facility or destination location. When an item 200 is removed from the container 400 and scanned, the scan can indicate that the container 400 no longer need be identified or tracked as an object in the system. The scan of the item 200 can disassociate the scanned item 200 from the sorted tracking object 100, bin, and/or container 400, can disassociate the sorted tracking object 100 associated with the container 400, and can dissolve the container 400 as an object or entity in the system. The disassociation and/or dissolution can be recorded in the visibility database 360 and/or tag database 350.

The process 410 moves to block 424, wherein the processing equipment 330 asks whether all active bins received a tracking object 100. If all active bins have not received a tracking object 100, the processing equipment 330 returns to block 420 to identify a bin lacking a tracking object 100. If all active bins have received a required tracking object 100, the system continues to block 426 and the tracking object sortation is complete. In some aspects, the parcel tracking system 310 associates all sorted tracking objects 100 with their respective items 200, bin, and/or container 400 upon completing sortation.

In some embodiments, the processing equipment 330 can detect the fill status of a container at a bin. The processing equipment 330 can detect the fill status with a sensor, such as a camera. The processing equipment 330 can generate an alert when the container 400 is filled to and/or above a threshold level and/or percentage full. The processing equipment 330 can, in some embodiments, sort a tracking object 100 into the bin after or when the alert is generated. That is, instead of sorting the tracking object to a bin when it is empty or has fewer than a threshold level or number of items, the processing equipment 330 will sort the tracking object 100 to the bin only after an alert is generated or a bin reaches a desired fullness threshold. This can advantageously position the tracking object 100 proximate the top of an item container, which can enable the tracking object 100 to be conveniently positioned for detection by readers and/or scanners.

In some embodiments, the processing equipment 330 can generate an alert when the container 400 (shown in FIG. 4C) is filled to and/or above a threshold level and/or percentage full such that the item container needs to be replaced. This can prompt the processing equipment 330 to prepare another tracking object 100 for introduction into the processing equipment 330. In some embodiments, filling a bin or container 400 can trigger the processing equipment 330 and central server 320 that a bin without a tracking object 100 is present, and the processing equipment will sort a tracking object 100 to that bin, as described herein. In some embodiments, the processing equipment 330 can detect when a container 400 is or is not at a bin location. The processing equipment 330 can pause sortation to a specific bin and/or container 400 when the container 400 is filled beyond a threshold and/or percentage or when a container 400 is not at the specific bin. The processing equipment 330 can continue sortation to a bin when a container 400 is replaced. In some embodiments, the processing equipment 330 introduces a new tracking object 100 when a container 400 is replaced. In some embodiments, the processing equipment 330 can sort the tracking object 100 into the replaced container 400 once the container 400 is filled to and/or above a threshold level and/or percentage or item sortation is complete.

In some embodiments, an operator can press a button on a user interface of the processing equipment 330, on a mobile computing device in communication with the central server 320 or the processing equipment 330, and/or the parcel tracking system 310 to alert the processing equipment 330 that a new item container is being used at a bin location and/or a new bin is being used and/or that an additional tracking object 100 will be needed. In some embodiments, an operator can press a button a second time or another button on a user interface of the processing equipment 330 and/or the parcel tracking system 310 to signal to the processing equipment 330 that a new container is in place and that an additional tracking object 100 should be introduced and sorted to the bin where the new item container 400 is positioned.

In some embodiments, a placard, which can include information associated with the destination 402, and/or which includes a computer readable code for sorting, moving, and handling containers, is generated by the parcel tracking system 310 and positioned on each container 400. In some embodiments, a tracking object 100 is introduced into the processing equipment 330 for each placard generated. The processing equipment 330 can generate and print a new placard when a container 400 is replaced at a bin. The processing equipment 330 can cause the automated system to introduce a new tracking object 100 to the processing equipment 330 when a new placard is generated for a replacement container 400. The placard can be associated with the tracking object 100, bin, container 400, and/or items 200 sorted to the respective container 400, which can be recorded in the visibility database 360 and/or tag database 350.

Figure 4B:
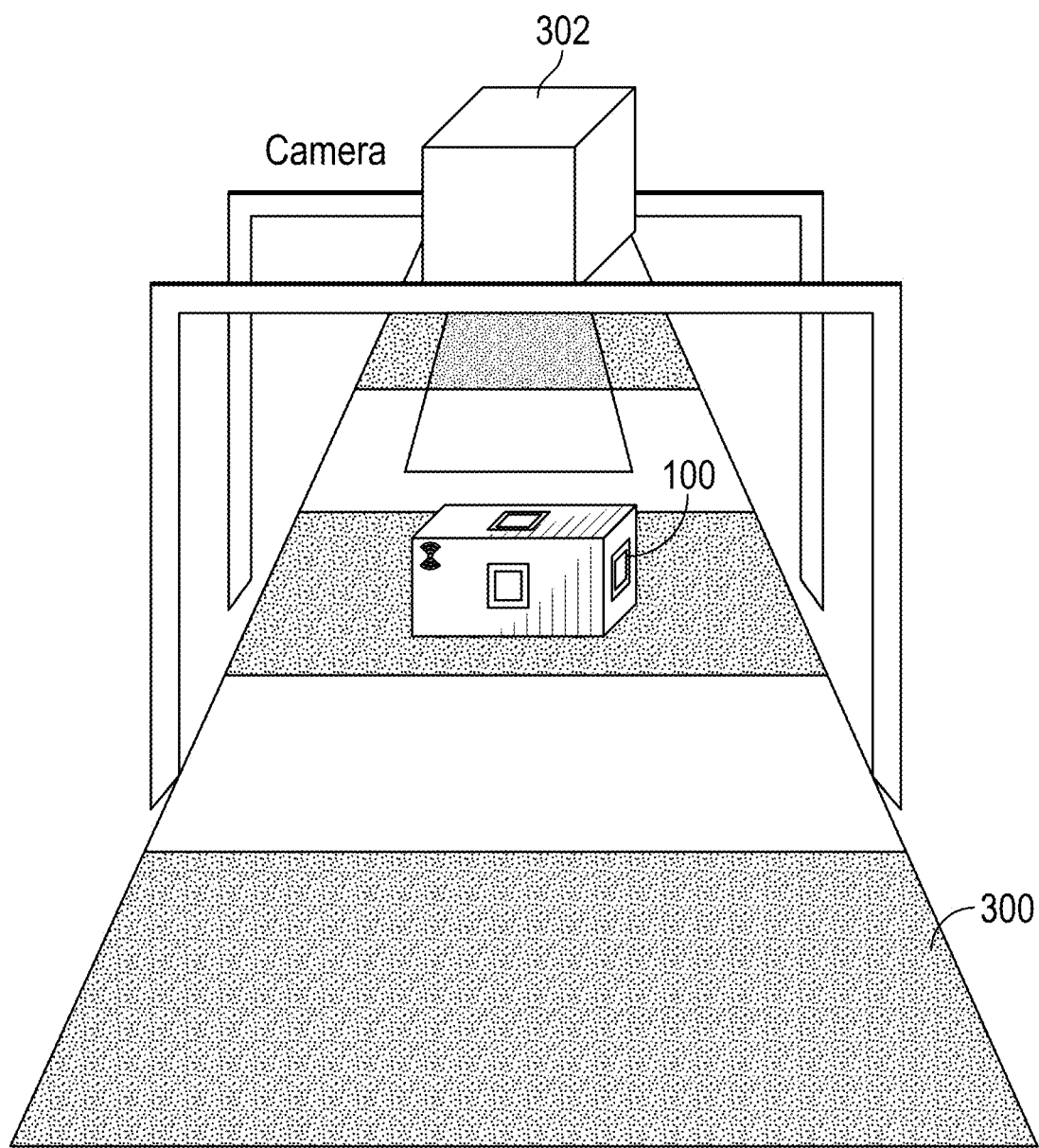
FIG. 4B depicts an embodiment of a tracking object on an exemplary conveyor being recognized by a camera.

FIG. 4B depicts a tracking object 100 on a conveyor 300 of the processing equipment 330. The tracking object 100 is being scanned by a camera or sensor 302 as the tracking object 100 is introduced to the processing equipment 330, as described above. In some aspects, the sensor 302 reads code 102 to recognize tracking objects 100. In some aspects, the sensor 302 reads tags, such as an RFID tag, to recognize tracking objects 100 from the tag database 350. In some aspects, the tracking objects 100 are scanned by the sensor 302 such that the tracking objects 100 are added to the tag database 350. In some aspects, the sensor 302 reads shipping labels on the items 200 and recognizes codes, such as ZIP Codes™, and/or other information regarding shipping routes and/or destination for sortation and/or organizational purposes.

Figure 4C:
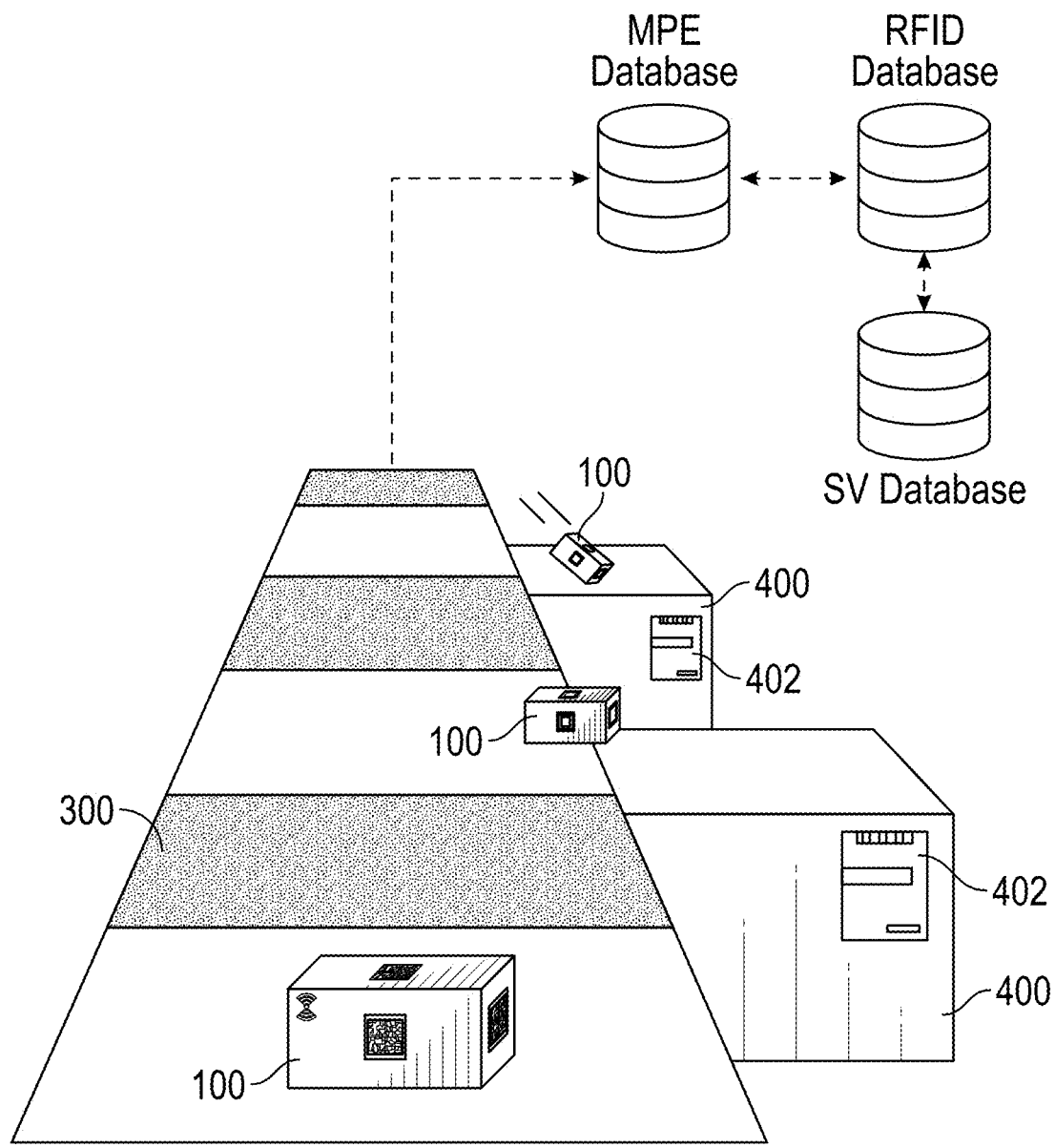
FIG. 4C depicts an exemplary system for a plurality of tracking objects being sorted from the conveyor into individual containers.

FIG. 4C depicts an embodiment of a tracking object 100 being sorted by the processing equipment 300 into a container 400 with a destination 402 thereon. The unique destination 402 can indicate the intended destination of the container 400. In some embodiments, where the tracking object 100 is associated with the intended destination for the container 400, the destination 402 need not be on the container. The processing equipment 300 includes a sortation machine having a number of bin locations that are at sortation points around the conveyor 300. Containers 400 are positioned at each bin location to collect items 200 during sortation. Bin location numbers are associated with a specific destination. In some embodiments, the destination 402 can be one or more ZIP Code™ or regional codes such that items 200 going to a given ZIP Code™ or regional code are directed to a specific bin location associated with that ZIP Code™ or regional code. In some embodiments, the destination can be a facility within the distribution network.

In some embodiments, the destination can be a grouping of delivery points, such as a carrier route, or any other grouping desired.

A single recognized tracking object 100 is sorted to a bin location and into the container 400. The container 400 may be intended for movement to another destination, either within or without the distribution facility in which the processing equipment 330 is located. The intended destination for the container 400 is associated with the tracking object 100, and can be associated with and/or stored in the visibility database 360. In some aspects, multiple recognized tracking objects 100 are sorted to a bin location and into a container 400.

Items 200 are sorted to bin locations associated with a destination 1. The items 200 sorted to a given bin location are associated with the destination 402 corresponding to the bin location within the processing equipment 330. As a result, items 200 are associated in a memory or database with the destination 402. In some embodiments, the parcel tracking system 310 can also store an association between each item 200 in the container 400 with the tag of the tracking object 100, which can be stored in the visibility database 360. This advantageously enables detected movement of the tracking object 100 to signify movement of the destination 402 and the items 200 associated with the destination 402. In some aspects, the items 200 are directly associated in a memory or visibility database 360 with the tracking object 100. In some embodiments, the tracking object 100 is associated with the bin location and/or container 400 and the items 200 are associated with the bin location and/or container 400 and the tracking object 100. It will be understood that when an item, container, or other object or device is associated with the tracking object 100, the object or device is associated in the memory of a computing device with the unique code of the tag located on or within the tracking object 100.

The tracking object 100 can be associated with information regarding the destination 402. For example, storing tracking object 100 associations in the database, such as the visibility database 360 and/or tag database 350, information pertaining to the container 400 movement, including a path through the distribution network, any handling requirements, time requirements, etc., for any, some, or all of the items 200 in the container 400 can be associated with the tracking object 100. When the tracking object 100 is read at any facility in the distribution network, instructions for the handling of the container 400 can be displayed, sent to, read, or accessed by equipment, system, or an operator in a facility.

Figure 5:
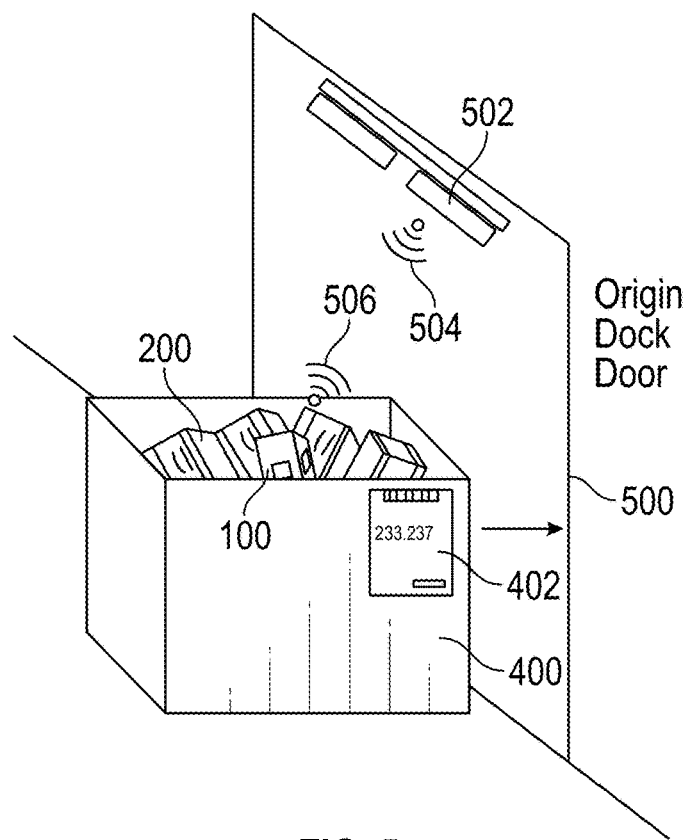
FIG. 5 depicts an exemplary container with an embodiment of a tracking object passing through a first door and being scanned by a reader.

FIG. 5 depicts the container 400 having a tracking object 100 passing through a first door 500 and being scanned by a reader 502. The first door 500 can be located at the origin facility location, such as a processing facility which created the container 400 having the items 200 therein. In some embodiments, the first door 500 can be at a facility through which the container 400 will pass as it moves through the distribution network. A plurality of first doors 500 can be positioned at a plurality of loading/unloading docks of the facility, such that containers 400 passing through any of the loading/unloading docks of the facility will pass through a first door 500 with a reader 502. The reader 502 is positioned on a top portion of the first door 500 but can be positioned at any location or locations on or proximate the first door 500.

The reader 502 emits a reader signal 504, such as an electromagnetic wave. The reader signal 504 reaches the tracking object 100, resulting in the tracking object 100 emitting a tracking parcel signal 506 that is communicated to the reader 502. In some aspects, passive, active, and/or semi-passive RFID can be used to facilitate communication between the tracking object 100 and the reader 502. In some embodiments, the reader 502 listens for a signal from a tracking object 100, such as when using Wi-Fi, Bluetooth, GPS, near field communication (NFC), and/or other methods to facilitate communication between the tracking object 100 and the reader 502. The reader 502 recognizes or identifies the tracking parcel signal 506 of the tracking object 100, generating a scan event. The reader 502 communicates to the visibility database 360, which can be via the central server 320, that the tracking object 100 has passed through the first door 500 and generates a scan event which can be referred to as a load event. The type of scan event can be determined using the location of the reader 502 and a prior scan event or prior scan location. By knowing the prior scan event or prior scan location, the parcel tracking system 310 can know in which direction the container 400 having the tracking object 100 therein is moving in the distribution network. The visibility database 360 records that the scan event, i.e. the container 400 and/or destination 402 associated with the tracking object 100 has passed through the first door 500 along with the items 200 associated with the destination 402 and/or container 400. The tracking parcel system 310 updates the visibility database 360 with the current location of the tracking object 100, destination 402, and/or items 200. In some aspects, the tracking object 100 is associated with the items 200 such that the visibility database 360 records that the items 200 associated with the tracking object 100 have passed through the first door 500. In some aspects, scan events can be understood to be the status. In some aspects, the tracking object 100 logs into a physical memory that the tracking object 100 passed through the first door 500. In some aspects, the tracking object 100 logs all reader signals 504 with which the tracking object 100 interacts.

Other readers, similar to reader 502, can be positioned along shipping routes, in-route facilities, or other locations such that the current location of the tracking object 100, destination 402, container 400, and/or items 200 is updated during shipping.

Figure 6A:
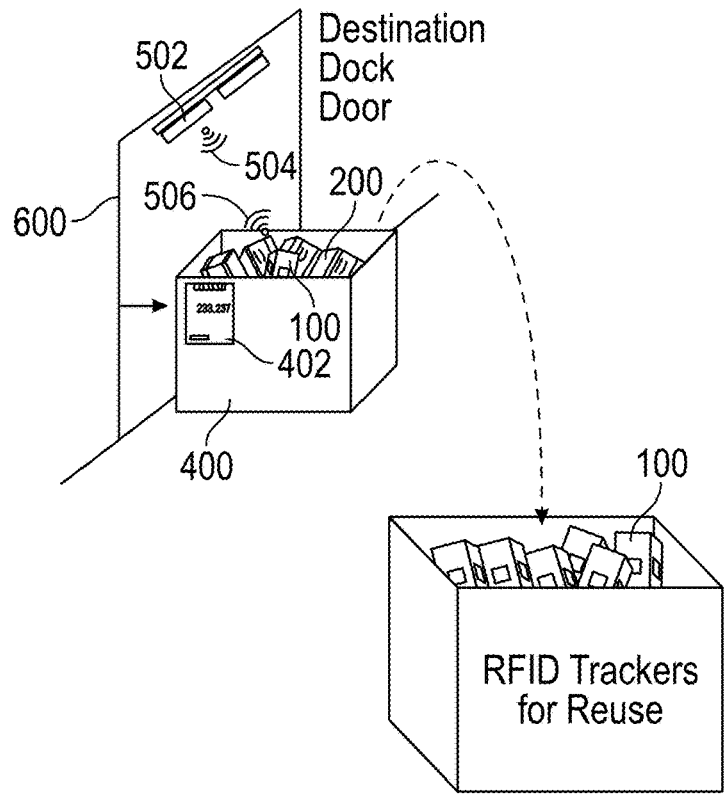
FIG. 6A depicts an exemplary container with the embodiment of a tracking object passing through a second door, being scanned by the reader, and disassociating the tracking object from the container and/or items.

FIG. 6A schematically illustrates the container 400 passing through a second door 600 and being scanned by the reader 502. When the reader 502 reads the tracking object 100, the parcel tracking system 310 can determine whether the tracking object 100 should be disassociated from the container or items therein. In some embodiments, the scan from the reader 502 can trigger an alert to an operator to remove the tracking object from the container 400. This can occur upon arrival at a facility, or later in the facility when the container or items therein are loaded into item processing equipment. When these scans occur, the parcel tracking system 310 can disassociate the tracking object 100 from the items contained within the container 400. In some embodiments, the tracking object 100 can be deactivated or disassociated when the tracking object 100 is scanned in subsequent item processing equipment 330. That is, if processing equipment 330 scans the tracking object 100 after it has been associated with a destination and items in a bin on prior equipment 330, the parcel tracking system 310 can determine that the tracking object 100 has arrived at a facility, and the container 400 has been broken down and the items are being processed at a downstream facility from when the container was formed and associated with the tracking object 100.

The second door 600 can be located at the destination or end facility location, i.e. the end facility location. A plurality of second doors 600 can be positioned at a plurality of loading/unloading docks of the destination facility, such that containers 400 passing through any of the loading/unloading docks of the destination facility will pass through a second door 600 with a reader 602.

The reader 502 emits a reader signal 504, such as an electromagnetic wave. The reader signal 504 reaches the tracking object 100, resulting in the tracking object 100 emitting a tracking parcel signal 506 that is communicated to the reader 502. The reader 502 recognizes or identifies the tracking parcel signal 506 of the tracking object 100. The reader 502 communicates to the visibility database 360 that the tracking object 100 has passed through the second door 600. The visibility database 360 or a parcel tracking system 310 connected to the visibility database 360 records that the destination 402 associated with the tracking object 100 has passed through the second door 600 along with the items 200 associated with the destination 402. The database is updated with the current location of the tracking object 100, destination 402, and/or items 200. Upon communication with the reader 502 of the second door 600, a system in communication with the database disassociates the tracking object 100 from the container 400 or the items in the container, and the associations for the tracking object 100 are dissolved. Upon communication with the reader 502 of the second door 600, the tracking object 100 is wiped of any stored data. After disassociation and/or wiping, the tracking objects 100 can be reused, i.e. be associated with a new destination 402 attached to a container 400. In some embodiments, where the tag of the tracking object 100 is writeable or rewriteable, the association can be changed or removed on the tag, or the tag can be reset to a different value, and the tag will await re-writing or re-association with another container 400. Where the tag of the tracking object 100 is an RFID tag, for example, the association between that tag and the container 400, the items 200, and/or the destination 402 is removed, and the tag awaits re-association during a subsequent processing operation.

Figure 6B:
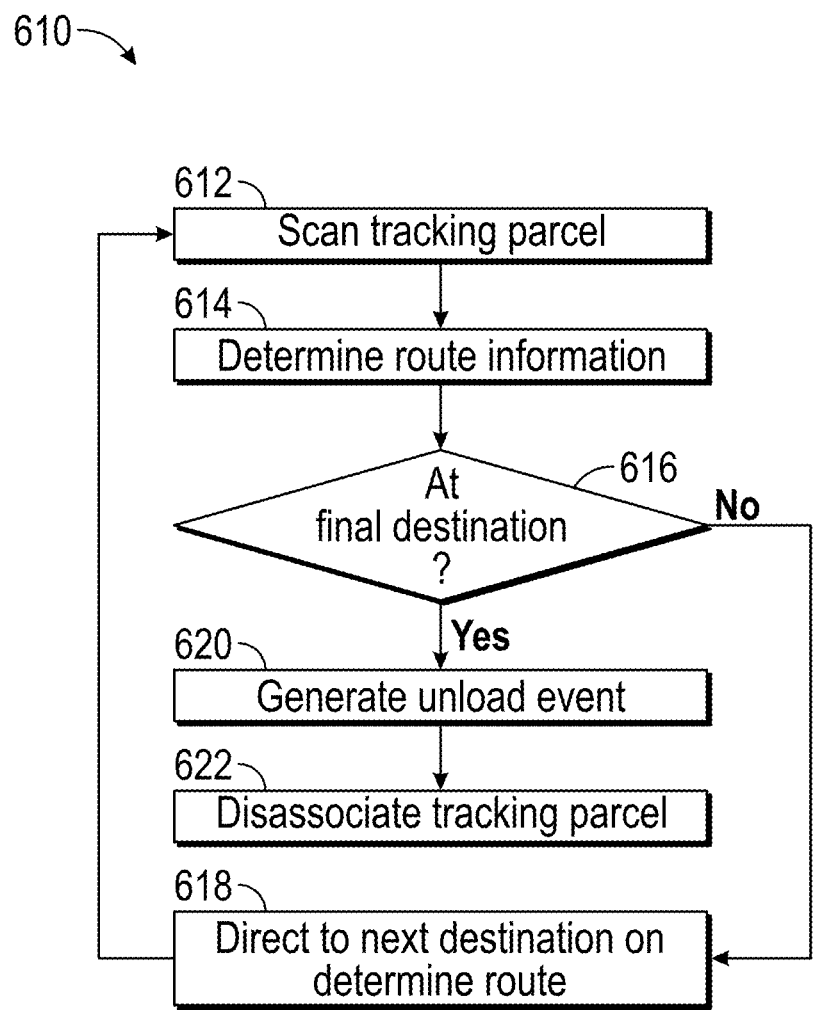
FIG. 6B depicts an exemplary method of utilizing tracking objects for container routing.

FIG. 6B depicts an exemplary method of utilizing tracking objects for container routing 610. At block 612, the reader 502 interacts with the tag of the tracking object 100. Upon interaction, the reader 502 can recognize the tag, which can include referencing the tag database 350. The central server 320 can generate a scan event based on the recognition and update the visibility database 360 with the scan event, such as the location or status of the tracking object 100 and the associated items 200 and/or container 400. At block 614, the central server 320 determines route information associated with the tracking object 100, which can be determined by querying the visibility database 360 and/or tag database 350. At block 616, the central server 616 asks whether the tracking object 100 is at the final destination. If the tracking object 100 is not at the final destination, the central server 616 directs the item container 400 containing the tracking object 100 to the next destination on the determined route associated with the tracking object 100 and returns to block 612, whereat the tag of the tracking object 100 interacts with another reader 370. If the tracking object 100 is at the final destination, the central server 320 continues to block 620 and generates an unload event scan, signifying that the container 400 associated with the tracking object 100 should be unloaded. The unload event scan associated with the tracking object 100 is communicated to the visibility database 360. At block 622, in the case of reusable tracking objects 100, the central server 320 disassociates the tracking object 100 from the item container 400, items 200, and/or destination 402 to which the tracking object 100 was associated, as described above. This can enable the tracking object 100 to be sorted and associated in subsequent sortation plans.

In some embodiments, the disassociated tracking objects 100 are transported from a local and/or destination facility to a regional or larger facility for subsequent sortation and use. For example, in some embodiments, the parcel tracking system 310 monitors the number of tracking objects 100 that are scanned by the reader 502 as the tracking objects 100 pass through the second door 600. The reader 502 can communicate to the visibility database 360 that the tracking objects 100 have passed through the second door 600. In some embodiments, the parcel tracking system 310 records a quantity of tracking objects 100 which have been sent to various distribution network facilities. The visibility database 360 can be updated with the current location of the tracking objects 100 at the destination or local facility.

In some embodiments, the parcel tracking system 310 generates an alert when the tracking objects 100 at a destination or local facility exceeds a predetermined number. In some embodiments, the parcel tracking system 310 generates an alert requesting tracking objects 100 from a destination or local facility when tracking objects 100 at the regional facility drops below a predetermined number and/or when tracking objects at a destination or local facility exceeds a predetermined number. In some embodiments, a container of tracking objects 100 can be prepared and sent from the regional facility to the local or destination facility to collect the tracking objects 100 when an alert is generated. In some embodiments, a container with tracking objects 100 can be sent from the local or destination facility to the regional facility when an alert is generated. Tracking objects 100 may accumulate at local facilities or unit delivery facilities, such as local post offices. In some embodiments, when a number of tracking objects 100 reaches a threshold level at a facility, a container containing the tracking objects 100 can be generated with a return destination for a distribution network facility that services the local facility. The unit delivery facility can put disassociated tracking objects 100 that have accrued in the container, and can put the container into the distribution system to return the tracking objects 100 to the distribution facility. The parcel tracking system 310 can assign one of the disassociated tracking objects 100 as a tracking object for the container of tracking objects 100 being sent upstream in the distribution network. In some embodiments, this process can be automated, and the tracking objects 100 can move though the distribution network to locations where they are in higher demand.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this disclosure be limited to the specific embodiments disclosed herein, but that it cover all modifications and alternatives coming within the true scope and spirit of the disclosure as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of tracking items, the method comprising:
   determining a quantity of tracking objects to be introduced into item processing equipment based on a quantity of individual items intended for processing on the item processing equipment, the determined quantity of tracking objects being less than the quantity of individual items;
   introducing the quantity of tracking objects into the item processing equipment, each of the tracking objects of the quantity of tracking objects comprising a radio-frequency identification (RFID) tag and an outer periphery enclosing the RFID tag;
   sorting individual items of the quantity of individual items into a plurality of bins of the item processing equipment, each of the plurality of bins associated with an intended destination;
   scanning a first tracking object of the quantity of tracking objects with a sensor;
   sorting, in the item processing equipment, the first tracking object into a first bin of the plurality of bins;
   identifying a second bin of the plurality of bins, the second bin not having a tracking object of the quantity of tracking objects therein;
   scanning a second tracking object of the quantity of tracking objects with the sensor;
   sorting, in the item processing equipment, the second tracking object of the quantity of tracking objects into the second bin of the plurality of bins;
   associating, in a database, the first tracking object with individual items of the quantity of individual items sorted into the first bin of the plurality of bins;
   associating, in the database, the second tracking object with individual items of the quantity of individual items sorted into the second bin of the plurality of bins; and
   updating in the database a status of the individual items of the quantity of individual items associated with the first and second tracking objects based on the first and second tracking objects being scanned by the sensor.

2. The method of claim 1, wherein the plurality of bins each comprise an item container located thereat, wherein sorting individual items of the quantity of individual items into the plurality of bins of the item processing equipment comprises moving individual items of the quantity of individual items into the item containers located at the plurality of bins, and wherein sorting the first and second tracking objects into the first and second bins of the plurality of bins comprises moving the first and second tracking objects into the item containers located at the first and second bins of the plurality of bins.

3. The method of claim 2, wherein sorting individual items of the quantity of individual items into the plurality of bins comprises moving individual items of the quantity of individual items into the item containers at the plurality of bins based on an intended destination of the individual items of the quantity of individual items.

4. The method of claim 2, further comprising:
   moving the item containers within a distribution network past a reader; and
   scanning, by the reader, the first and second tracking objects in the item containers.

5. The method of claim 4, further comprising updating item information in the database for the individual items of the quantity of individual items in the item containers based on the scanning of the first and second tracking objects by the reader.

6. The method of claim 4, wherein scanning the first and second tracking objects in the item containers further comprises disassociating the first and second tracking objects with the individual items of the quantity of individual items to facilitate reuse of the first and second tracking objects.

7. The method of claim 6, further comprising deleting data stored in a physical memory of the first and second tracking objects upon the RFID tag interacting with the reader.

8. The method of claim 1, wherein the first and second tracking objects are rectangular prisms having six flat surfaces and a computer readable code on each of the six flat surfaces.

9. A method of tracking items utilizing tracking objects, the method comprising:
   determining a quantity of tracking objects to be introduced into item processing equipment based on a quantity of individual items intended for processing on the item processing equipment, the determined quantity of tracking objects being less than the quantity of individual items;
   introducing the quantity of tracking objects into a sortation volume comprising a quantity of individual items, each of the tracking objects of the quantity of tracking objects comprising a radio-frequency identification (RFID) tag and an outer periphery that surrounds the RFID tag;

sorting individual items of the quantity of individual items into a plurality of bin locations;
scanning a first tracking object of the quantity of tracking objects with a sensor;
sorting the first tracking object to a first bin location of the plurality of bin locations and into an item container positioned at the first bin location;
scanning a second tracking object of the quantity of tracking objects with the sensor;
identifying a second bin location of the plurality of bin locations, the second bin location not having a tracking object;
sorting the second tracking object to the second bin location and into an item container positioned at the second bin location;
associating, in a database, the first and second tracking objects with individual items of the quantity of individual items sorted into the item containers at the first and second bin locations;
interacting the RFID tag of the first and second tracking objects with a reader to generate scan events that are recorded in the database, the scan events indicative of statuses of the associated individual items of the quantity of individual items;
moving the item containers within a distribution network and past a second reader;
scanning, by the second reader, the first and second tracking objects in the item containers; and
in response to scanning the first and second tracking objects in the item containers by the second reader, disassociating, in the database, the first and second tracking objects from the individual items of the quantity of individual items to facilitate reuse of the first and second tracking objects.

10. The method of claim 9, wherein each of the first and second tracking objects comprise a physical memory that is configured to record interaction data between the RFID tag and the reader.

11. The method of claim 10, further comprising deleting data stored in the physical memory upon the RFID tag interacting with the second reader.

12. A tracking object comprising:
an outer periphery bounding an internal volume;
a tag disposed within the internal volume, the tag configured to emit a signal, wherein the signal includes a unique identifier;
a filler material disposed within the internal volume and around the tag configured to maintain the tag at a central location within the internal volume; and
a computer readable code positioned on an external surface of the outer periphery;
wherein the tracking object is configured to be introduced into item processing equipment that processes a quantity of items for delivery, sorted into a bin location which does not have another tracking object, and associated, in a database, with a plurality of items of the quantity of items sorted to the bin location such that a scan event of the tracking object corresponds to a status of the plurality of items of the quantity of items sorted to the bin location.

13. The tracking object of claim 12, wherein the outer periphery is sized to have at least one dimension larger than a minimum distance for preventing the emitted signal from the tag to experience interference from a metal surface proximate the outer periphery.

14. The tracking object of claim 12, wherein the computer readable code encodes a value that is associated in a tag database with the unique identifier.

15. The tracking object of claim 12, wherein the computer readable code encodes the same identifier as in the unique identifier emitted in the signal.

16. The tracking object of claim 12, wherein the tag comprises writeable memory configured to store an intended destination for the tracking object.

17. The tracking object of claim 12, wherein the tag is configured to emit the signal in response to interrogation by electromagnetic radiation.

18. The tracking object of claim 12, wherein the tag is configured to emit the signal at a given periodicity.

* * * * *